(12) United States Patent
Fuchs et al.

(10) Patent No.: US 12,622,360 B2
(45) Date of Patent: May 12, 2026

(54) GEAR ASSEMBLY FOR A SQUARE BALER

(71) Applicant: Usines CLAAS France S.A.S, St. Rémy/Woippy (FR)

(72) Inventors: Volker Fuchs, Saarburg (DE); Michael Schulte, Delbrück (DE)

(73) Assignee: Usines CLAAS France S.A.S, St. Rémy/Woippy (FR)

( * ) Notice: Subject to any disclaimer, the term of this patent is extended or adjusted under 35 U.S.C. 154(b) by 116 days.

(21) Appl. No.: 18/541,984

(22) Filed: Dec. 15, 2023

(65) Prior Publication Data

US 2024/0196803 A1 Jun. 20, 2024

(30) Foreign Application Priority Data

Dec. 16, 2022 (DE) .......................... 102022133713.8

(51) Int. Cl.
| | |
|---|---|
| *F16H 61/16* | (2006.01) |
| *A01F 15/04* | (2006.01) |
| *A01F 15/08* | (2006.01) |
| *F16D 25/0638* | (2006.01) |

(52) U.S. Cl.
CPC ........ *A01F 15/0841* (2013.01); *A01F 15/042* (2013.01); *F16D 25/0638* (2013.01)

(58) Field of Classification Search
CPC .......................... A01F 15/0841; A01D 89/005
See application file for complete search history.

(56) References Cited

U.S. PATENT DOCUMENTS

| | | | |
|---|---|---|---|
| 6,708,478 B1 | 3/2004 | Mesmer et al. | |
| 8,973,493 B2* | 3/2015 | O'Reilly | A01F 15/0841 |
| | | | 100/280 |
| 2003/0167939 A1 | 9/2003 | Roth | |
| 2014/0165859 A1 | 6/2014 | O'Reilly et al. | |
| 2016/0157434 A1 | 6/2016 | Arnould et al. | |
| 2017/0105352 A1* | 4/2017 | Rosseel | A01F 15/0841 |
| 2018/0242528 A1* | 8/2018 | Rodewald | B60W 10/02 |

(Continued)

FOREIGN PATENT DOCUMENTS

| | | |
|---|---|---|
| EP | 4151077 A1 | 3/2023 |
| WO | 2014170318 A1 | 10/2014 |
| WO | 2022219030 A1 | 10/2022 |

OTHER PUBLICATIONS

European Search Report for EP Application No. 23204235.8-1105 mailed on Apr. 4, 2024.

Primary Examiner — Stacey A Fluhart
(74) *Attorney, Agent, or Firm* — Lempia Summerfield Katz LLC

(57) ABSTRACT

A gear assembly for a square baling press. The gear assembly drives a ram arranged movably between end positions in a pressing channel of the square baling press and at least one additional working unit of the square baling press. The gear assembly comprises two side gears and at least one reduction gear that is downstream from the particular side gear and may be connected on the output side to a crankshaft on which the ram is mounted. At least one flywheel is interposed between the particular side gear and the reduction gear downstream thereof. At least one of the reduction gears comprises a shiftable overload clutch which is designed to brake the reduction gears downstream from the flywheels to a standstill when a mechanical overload occurs.

18 Claims, 4 Drawing Sheets

(56) References Cited

U.S. PATENT DOCUMENTS

| | | | |
|---|---|---|---|
| 2021/0015049 A1* | 1/2021 | Naeyaert | A01D 69/08 |
| 2021/0127580 A1* | 5/2021 | Singh | A01D 75/182 |
| 2021/0259156 A1* | 8/2021 | Bonte | A01F 15/0841 |
| 2023/0077734 A1 | 3/2023 | Scharf et al. | |
| 2024/0090382 A1 | 3/2024 | Führle et al. | |

* cited by examiner

GEAR ASSEMBLY FOR A SQUARE BALER

CROSS REFERENCE TO RELATED APPLICATION

This application claims priority under 35 U.S.C. § 119 to German Patent Application No. DE 102022133713.8 filed Dec. 16, 2022, the entire disclosure of which is hereby incorporated by reference herein. The application is related to U.S. utility application Ser. No. 18/541,981, incorporated by reference herein in its entirety.

TECHNICAL FIELD

The present invention relates to a gear assembly for a square baler and to a square baler with a drivetrain that comprises such a gear assembly.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Square balers may be used in agriculture to: pick up or collect, for example, semi-mature harvested material such as straw, hay, grass or the like, which has been deposited in a swath; shred it further; and compress or press it into square bales. For example, US Patent Application Publication No. 2016/0157434 A1 and U.S. Pat. No. 6,708,478 each disclose square balers, both of which are incorporated by reference herein in their entirety. For this purpose, the square balers have various working units which serve for the required conveying and/or further processing of the harvested material. Such working units are, for example, a cutting rotor for shredding the collected harvested material, a feed rake for pre-compacting and feeding the harvested material shredded by the cutting rotor into a pressing channel of the square baler, a ram which is movably arranged in the pressing channel and presses the pre-compacted harvested material located in the pressing channel into a square bale, and a knotter which binds the pressed bale. These working units are usually drivingly connected with a central drivetrain of the square baler, which is connected to a power take-off shaft of an agricultural production machine, such as a tractor, when the square baler is in operation. To drive working units of the square baler, such as the ram, a gear assembly is provided which drives the ram arranged in the press channel of the square baler so as to be movable between end positions, and at least one further working unit of the square baler.

Such square balers conventionally comprise a so-called flywheel, which serves as a damper and energy store between a drive unit of the agricultural production machine providing the drive output of the square baler and the working units of the square baler.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
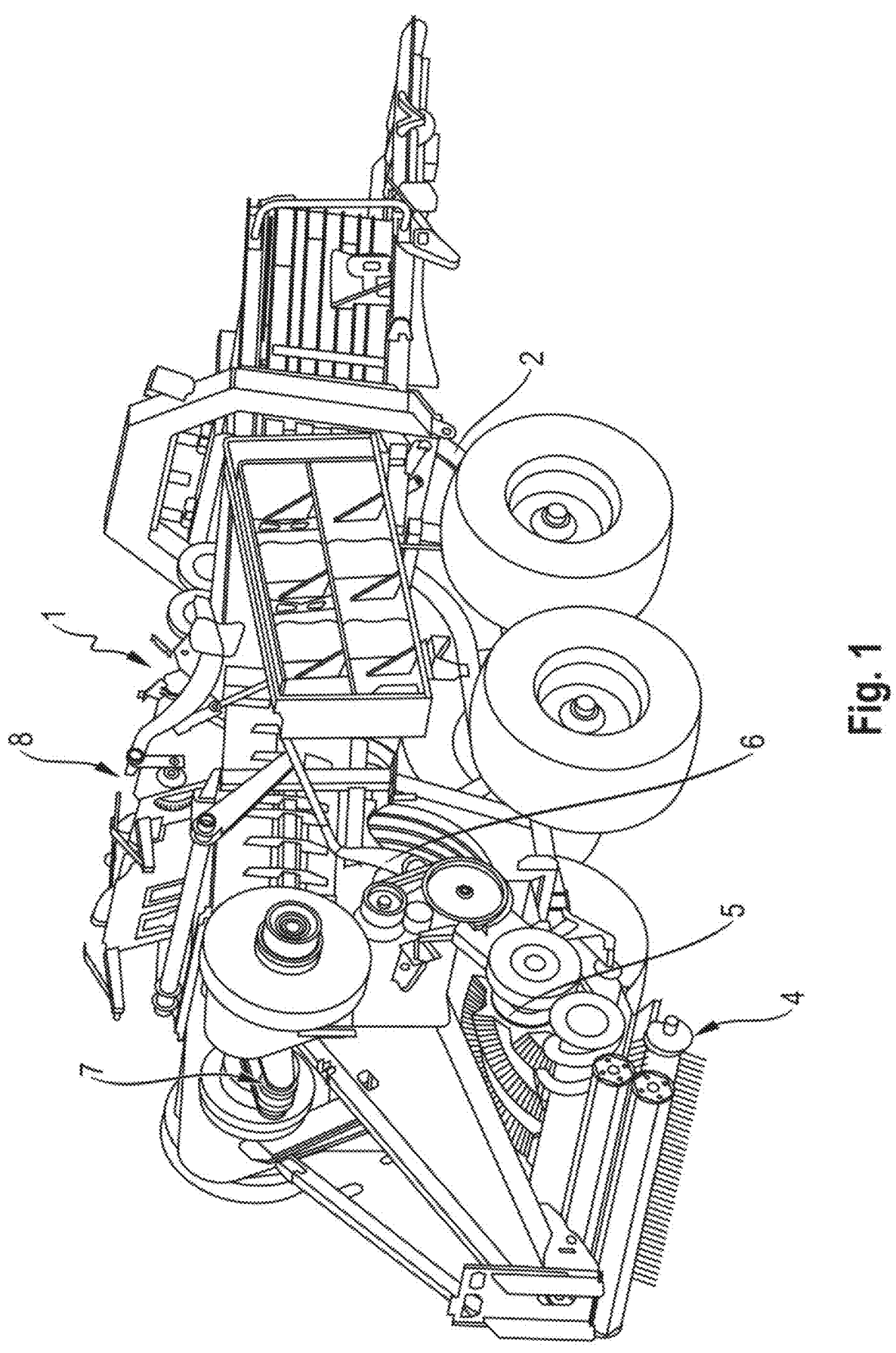
FIG. 1 illustrates a schematic and exemplary representation of a square baler in side view.

As discussed in the background, square balers may include a so-called flywheel, which serves as a damper and energy store between a drive unit of the agricultural production machine providing the drive output of the square baler and the working units of the square baler. Efforts are being made to develop increasingly powerful and larger square balers which compress harvested material that has been transferred to the pressing channel and pre-compressed into a square bale with a very high pressure. These efforts may lead to the fact that ever higher drive outputs must be supplied to the ram using the drivetrain of the square baler, which may, in turn, lead to the fact that ever larger and heavier flywheels must be installed in order to be able to provide the required drive outputs at all and to reduce any loads on the drivetrain of the square baler during operation.

However, the use of larger and heavier flywheels leads to an increase in the weight of the square baler, and a very high drive output is required to accelerate the flywheel from a standstill. At present, such flywheels are arranged or positioned on a drive shaft of the square baler, which is often designed as a cardan shaft and is connected to a torque input connection at which the drive output of the drive unit of the agricultural production machine is provided using a power take-off shaft. The drive shaft carrying the flywheel may be mechanically connected to the working units of the square baler. Accordingly, when the square baler is started, the flywheel must therefore always be accelerated from a standstill together with a majority of the drivetrain components and the working units of the square baler connected to the drivetrain. With some agricultural machines, this may mean that when the square baler is started up, the drive unit of the agricultural machine stalls undesirably due to the high inertia, making it difficult or impossible to start up the square baler. In addition, the engagement clutch may be damaged.

The square baler described in WO 2014/170318 A1 comprises a transmission device arranged on a cardan shaft between a torque input connection and a flywheel, which may be switched between a starting state and an operating state. In the operating state, the transmission device transmits a rotary motion of a power take-off shaft of an agricultural production machine completely to a flywheel so that the transmission is comparable to a conventional axle. On the other hand, in the starting state, the transmission device transmits the rotary motion of the PTO shaft to the flywheel only partially. This allows the PTO shaft to have a higher speed than the flywheel. The transmission device is designed as a planetary gear or as a friction clutch. Due to the transmission device, a flywheel may be used in the square baler that is too heavy and/or too large per se to be put into operation via a direct connection.

During operation of a square baler, an overload situation may occur, which may make it necessary to brake the working units in order to prevent severe damage to one or more devices, such as to the square baler, such as the various working units and/or the working machine towing and driving the square baler. In particular, to prevent injury to an operator and the occurrence of damage, it may be necessary to brake the working units within a predetermined period, such as a period of less than one second. An increase in the size of the flywheel, as disclosed in the state of the art, is accompanied by an increase in the moving mass to be braked.

Based on the aforementioned, in one or some embodiments, a gear assembly is disclosed and configured to drive a ram arranged or positioned movably between end positions in a pressing channel of a square baler and at least one further working unit, which may reliably provide the drive power required at the drive units of the square baler (e.g., the drive power of the ram) and/or may take into account the increased requirements for the operational safety of a square baler.

Thus, in one or some embodiments, a gear assembly for a square baler is disclosed, which may be configured to drive a ram arranged or positioned movably between end positions in a pressing channel of the square baler, and at least one further working unit of the square baler. In one or some embodiments, the transmission arrangement of the gear assembly comprises at least two side gears (such as two side gears) and at least one reduction gear that is connected downstream from the particular side gear (e.g., at least one of the two side gears), and that is configured to connect on an output side to a crankshaft on which the ram may be mounted. The gear assembly may further include at least one flywheel that is interposed between (e.g., positioned between) the particular side gear and the reduction gear connected downstream thereof. At least one of the reduction gears may comprise a shiftable overload clutch which is designed or configured to brake the reduction gears downstream from the flywheels to a standstill when a mechanical overload occurs.

In one or some embodiments, the gear assembly may comprise two side gears, two reduction gears and at least two flywheels, wherein in each case one reduction gear is downstream from a side gear, and in each case, at least one flywheel is connected between a side gear and a reduction gear, wherein each reduction gear is configured for connection to the crankshaft on its respective output side. Further, at least one of the reduction gears may comprise the shiftable overload clutch.

By arranging a shiftable overload clutch in at least one of the reduction gears, it is possible to brake all the working units of the square baler simultaneously. This may prevent damage to one or both of the working units or the drivetrain of an agricultural machine driving the square baler.

In one or some embodiments, at least one shiftable clutch device is interposed between (e.g., arranged between or positioned between) the particular flywheel and the reduction gear connected downstream thereof, which may assume, be configured or be controlled into a disengaged shift position during braking. Thus, in one mode of operation, the particular flywheel may be in an engaged shift position, and in another mode of operation (e.g., during braking), the particular flywheel may be in the disengaged shift position.

By arranging or positioning at least one flywheel between the particular side gear and the at least one reduction gear in combination with the shiftable clutch device connected downstream from the at least one flywheel and upstream from the reduction gear, it may be possible to first accelerate the flywheel from a standstill when starting up the square baler and only then engage the ram and the reduction gears associated with the ram. In this way, due to the inertia of the drivetrain components, a load acting on the drive unit of the agricultural production machine may be reduced to a considerable extent since only the at least one flywheel and the drivetrain components connected upstream thereof have to be accelerated from a standstill, but the ram and the reduction gear associated therewith do not yet have to be driven.

In particular, the simultaneous opening of the shiftable clutch device between the reduction gears and the flywheels may ensure that the part of the gear assembly that is driven by the PTO shaft of the agricultural machine and comprises the two side gears and the flywheels is not braked.

In one or some embodiments, the at least one shiftable clutch device may be arranged or positioned directly between the flywheel and a gear input of the reduction gear connected downstream from the at least one flywheel. This may create a short path for power transmission to the ram since only the at least one shiftable clutch device and the particular reduction gear are arranged or positioned between the ram and the at least two flywheels. The drive output generated with the aid of the flywheels may be transmitted almost without loss and very directly to the reduction gear, which may convert the drive output in such a way that a high torque required for the operation of the ram is achieved at low speed.

In particular, the at least one shiftable clutch device may be a hydraulically-actuated clutch device, such as a hydraulically-actuated multiplate clutch. On the one hand, this may ensure that a sufficiently high pressure is generated in the at least one shiftable clutch device so that the drive power may be reliably transmitted to the reduction gears downstream from the flywheels without generating large losses. On the other hand, the hydraulic actuation may be used to achieve variable control of the shiftable clutch devices so that they may initially be operated in slip mode for a certain time during the shifting process for coupling the ram, for example.

In one or some embodiments, the gear assembly is assigned a control device which is configured to control the overload clutch and/or the clutch devices. In this case, the control device may be configured to actuate the shiftable clutch devices when the square baler is started up, in order to transfer them into an open state in which the at least one flywheel and the reduction gear arranged or positioned downstream from it are decoupled from one another, and as soon as the at least one flywheel has reached a nominal speed or a speed which is below the nominal speed (e.g., the control device monitors the rotational speed; responsive to the control device determining that the rotational speed which is at least 70% below the rated speed, the control device sends a command; responsive to the control device determining that the rotational speed which is no greater 70% below the rated speed, the control device sends a command; etc.), the control device is configured to control (e.g., send a command to) the shiftable clutch devices to transfer into an engaged state in which the at least one flywheel and the reduction gear arranged or positioned downstream thereof are operatively connected to one another.

In one or some embodiments, the control device may be configured to activate the at least one overload clutch and the shiftable clutch devices simultaneously when a mechanical overload occurs, in order to brake the working units and at the same time decouple the flywheels from the reduction gears downstream from them by opening the shiftable clutch devices. For example, the control device, responsive to detecting a mechanical overload, may be configured to send at least one command (e.g., simultaneously send a command to the at least one overload clutch and a command to the shiftable clutch to open) in order to activate the at least one overload clutch and the shiftable clutch devices simultaneously in order to simultaneously brake the working units and decouple the flywheels from the reduction gears downstream from them.

In one or some embodiments, one or more sensors configured to detect a mechanical overload may be assigned to one or both of the gear assembly or the working units. The sensors may transmit signals (e.g., sensor data) to the control device for evaluation. The control device is configured to detect the occurrence of a mechanical overload on the basis of the evaluation of the signals provided by the sensors in order to correspondingly actuate the at least one overload clutch and/or the clutch devices. For example, the control device may be configured to compare the sensor data with predetermined value(s) in order to determine the occurrence of the mechanical overload.

Alternatively or additionally, the gear assembly may have pin-shaped shear elements for detecting a mechanical overload. The shearing of the shear elements when a mechanical overload occurs causes the overload clutch to be actuated or shifted in order to brake the reduction gears downstream from the flywheels to a standstill. In either instance (e.g., whether via determination of the mechanical overload by the control device or the pin-shaped shear elements), a signal is sent to one or more devices (such as the overload clutch) in order to brake the reduction gears downstream from the flywheels (e.g., brake to a standstill).

In one or some embodiments, the overload clutch may be a hydraulically-actuatable clutch device, such as a hydraulically actuatable multi-plate clutch.

In one or some embodiments, the overload clutch may comprise a disk pack and a hydraulically pressurizable piston in which at least one spring element is arranged or positioned, wherein the piston is held by the hydraulic pressure against or counter the spring force of the at least one spring element in a position spaced from the disk pack in which the overload clutch is open, and when an overload is detected, the overload clutch is depressurized in which the overload clutch is closed (e.g., responsive to receiving a command, such as from the control device or the pin-shaped shear elements, the overload clutch is depressurized and in turn closed). When the overload clutch is depressurized, the piston may be pressed against the disk or plate pack with a predefined spring force by means of the at least one spring element in order to brake the reduction gears and therefore the working units driven by them.

In one or some embodiments, the control device may be configured to actuate the interposed shiftable clutch devices after detection of the standstill of the transmission gears in order to transfer them from the disengaged shift position for braking to their engaged shift position by progressive closure. The standstill of the transmission gears may be detected by a suitable sensor system that monitors the speed of the crankshaft, for example. In this regard, the sensor system may generate respective sensor data and may transmit the respective sensor data to the control device for evaluation. In turn, the control device may be configured to evaluate the respective sensor data (e.g., by comparison with respective predetermined value(s)) in order to detect the standstill of the transmission gears. In one or some embodiments, the term progressive closing may refer to the closing of the clutch devices using a linearly or progressively increasing characteristic curve. The progressive closing of the clutch devices connected between the at least one flywheel and the particular transmission gear may make it possible to brake the flywheels and the drive components upstream from them. This may assume that the working machine is no longer actively driving the square baler. Braking the flywheels may be necessary for reasons of operational safety since the flywheels may continue to rotate beyond the time at which the transmission gears come to a standstill due to their mass inertia.

In one or some embodiments, the two flywheels are arranged or positioned one behind the other on an output of the particular side gear, wherein another clutch device is arranged or positioned between the two flywheels. This may mean that instead of one large flywheel, two smaller flywheels may be used which may be engaged in stages. This may have an advantageous effect on the drive power requirement of the agricultural machine. In one or some embodiments, the two flywheels assigned to the particular side gear may have the same dimensions. Alternatively, the two flywheels assigned to the particular side gear may differ from each other.

In particular, the two side gears may be designed as traction gears, such as V-belt gears or chain gears, or as multi-stage spur gears, bevel gears or crown gears. The design of the two side gears as traction gears may make it possible to compensate for torsion in the reduction gears assigned to the ram during operation of the square baler due to a load generated by the ram during operation or to prevent such torsion from being transferred to other components of the gear assembly or a drivetrain of the square baler since this could lead to damage or destruction of the components.

In particular, the reduction gears may be designed as planetary gears or as multi-stage spur gears. In one or some embodiments, the two reduction gears are designed as two-stage planetary gears, wherein the two-stage planetary gears are designed in each of the two gear stages for driving via a sun gear and for output via a web on which planetary gears are mounted, wherein a web of the second stage of the particular planetary gear may be connected to the crankshaft. The use of the two-stage planetary gears as reduction gears may ensure, on the one hand, the previously described conversion of the drive power to the drive power required to operate the ram. At the same time, the planetary gears may be characterized by a very compact installation space and may ensure a reduced weight compared to other types of gear which would be suitable for such a reduction of the drive output.

In one or some embodiments, each of the reduction gears is designed with a shiftable overload clutch. This may create a gear assembly that is particularly suitable for high output at the ram. By using two assemblies in each case, symmetrical braking of the reduction gears and therefore of the crankshaft carrying the ram may be achieved, wherein each side of the gear assembly experiences a reduced load. Another advantage is that the use of identical reduction gears may result in a cost advantage.

In one or some embodiments, a square baler with a drivetrain comprising such a gear assembly is disclosed. Reference is made to the gear assembly described herein.

Referring to the figures, FIG. 1 shows a schematic and exemplary representation of a square baler 1 in side view. The square baler 1 may be coupled to an agricultural production machine not shown in the figures, such as a tractor, so that the square baler 1 and the agricultural production machine jointly form a so-called agricultural train. The square baler 1 may comprise a housing, not shown in FIG. 1, which surrounds the components of the square baler 1 attached to a chassis 2 of the square baler 1. The square baler 1 may further comprise a drivetrain 3 shown in more detail in FIG. 2, through which various working units of the square baler 1 may be driven. Such working units are, for example, a pickup device 4 (known as a pickup for picking up or collecting harvested material deposited in a swath on an agricultural area), a cutting rotor 5 for shredding the picked-up harvested material, a feed rake 6 for pre-compressing the shredded harvested material and feeding it into a pressing channel of the square baler 1, a ram 7 movably arranged or positioned between end positions in the pressing channel of the square baler 1 for pressing the pre-compressed crop into a square bale, and a knotter 8 for binding the pressed square bale. A needle and its needle drive which interact with the knotter 8 may form another working unit.

In one or some embodiments, the drivetrain 3 of the square baler 1 is supplied with drive power by the agricultural machine. For this purpose, at the rear, the agricultural production machine has a power take-off (PTO), known per se. The drivetrain 3 of the square baler 1 may comprise a drive shaft 9, which in turn may comprise a torque input connection of the drivetrain 3, through which the drivetrain 3 of the square baler 1 may be connected to the power take-off of the agricultural production machine.

In one or some embodiments, a first power split 10, which may be formed as a bevel gear stage, is connected to the drive shaft 9 of the drivetrain 3. One bevel gear of the first power split 10, which may be formed as a bevel gear stage, comprises a continuous output shaft 11 which extends transversely to the drive shaft 9 (e.g., transversely to the main extension direction of the square baler 1), to which the other bevel gear of the bevel gear stage may be connected. It is also contemplated that the output shaft 11 is designed in two parts so that a first and a second output shaft 11*a*, 11*b* are connected by a bevel gear 10*a*, 10*b* arranged or positioned on these to the power split 10 designed as a bevel gear stage. For illustration purposes, the additional bevel gear 10*a* and the design of the output shaft 11 as a continuous shaft are shown with dashed lines.

Figure 2:
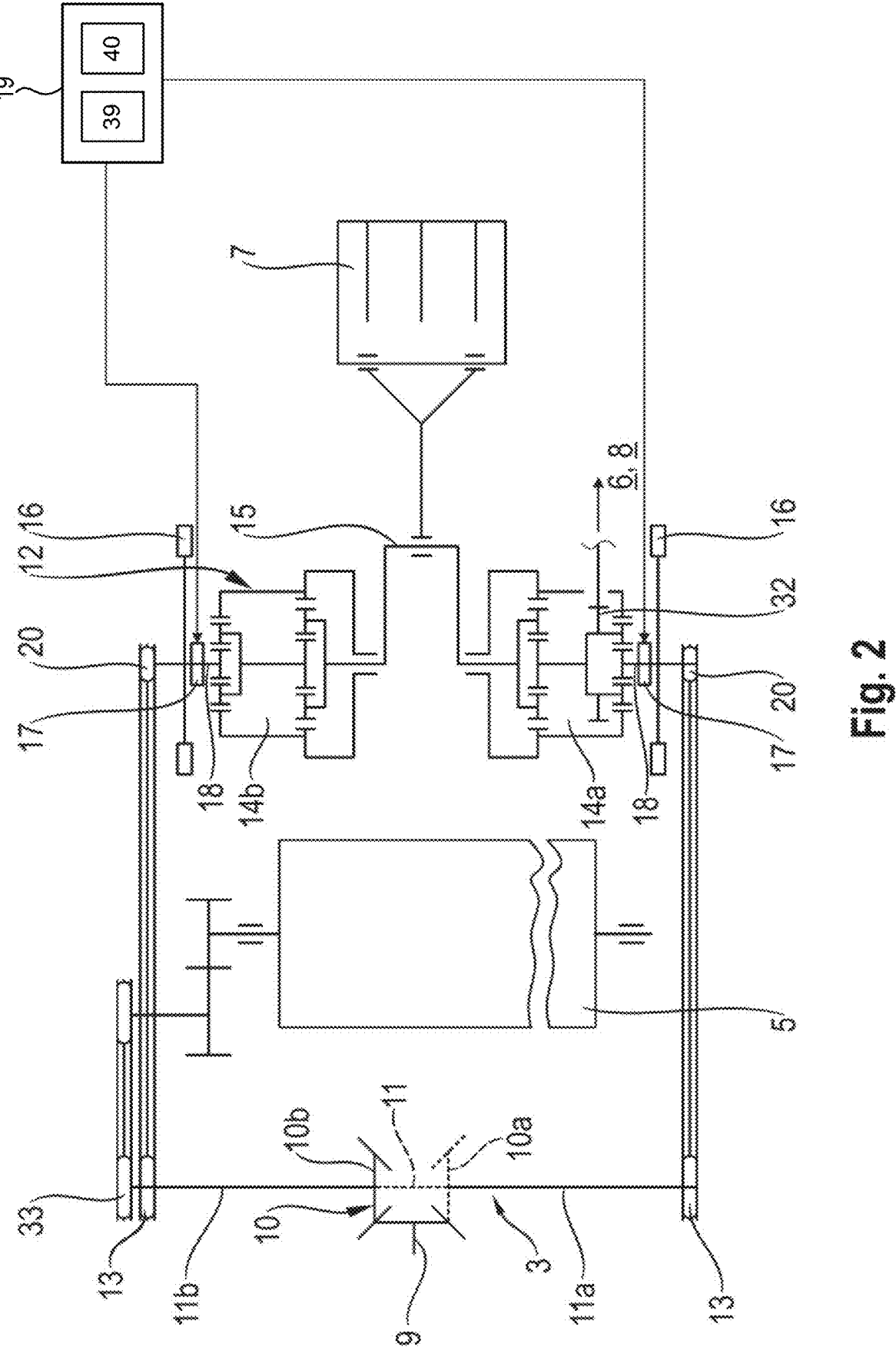
FIG. 2 illustrates a schematic and exemplary representation of a gear assembly of the square baler according to FIG. 1.
Figure 3:
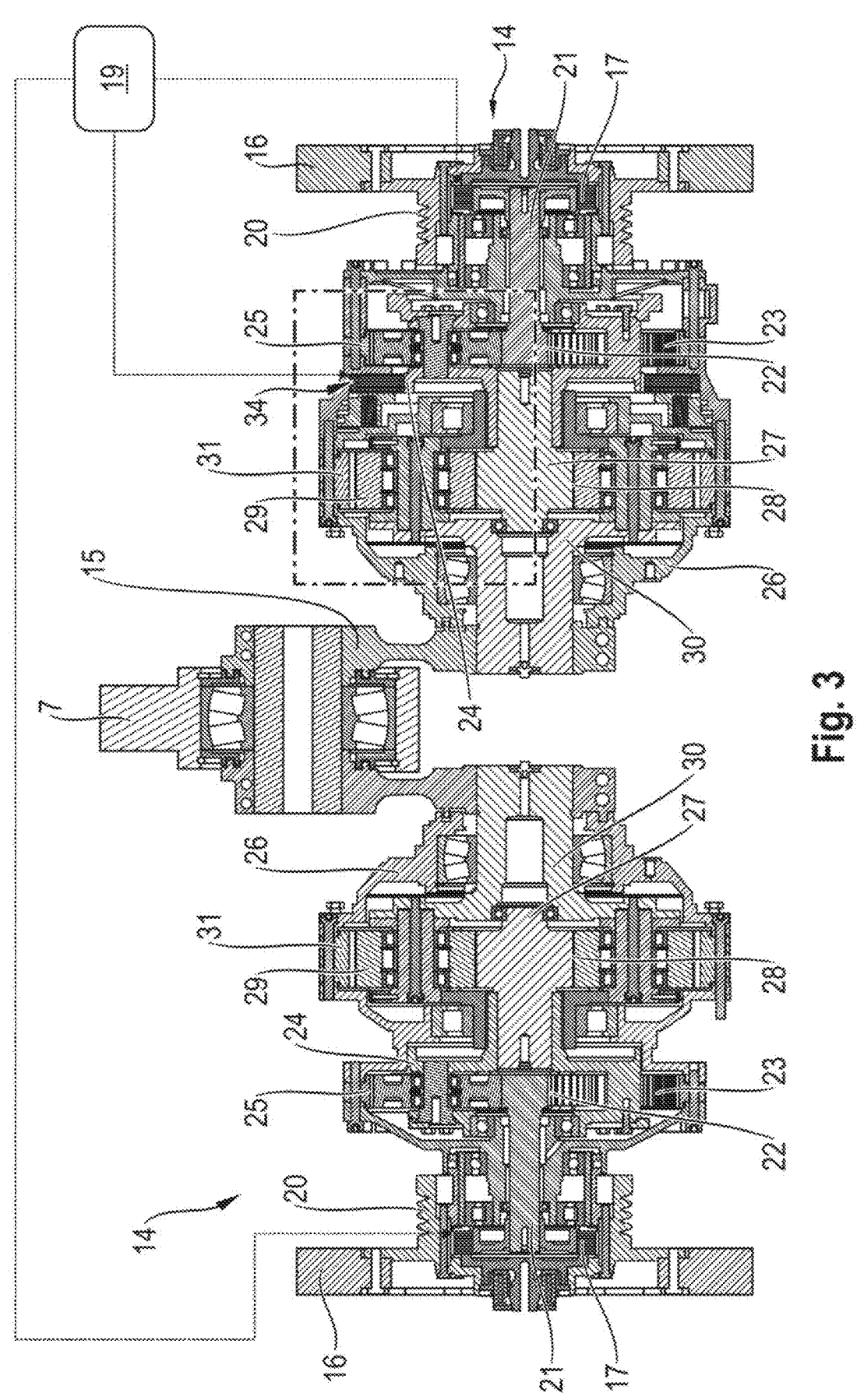
FIG. 3 illustrates a schematic and exemplary partial sectional view of an embodiment of the gear assembly according to the invention.

In one or some embodiments, the square baler 1 and the drivetrain 3 of the square baler 1 comprises, in addition to the aforementioned drivetrain components, a gear assembly 12. As shown in FIGS. 2 and 3, the gear assembly 12 may comprise two side gears 13, which may be indirectly drivable by a power take-off shaft of the agricultural production machine. In this context, "indirectly" may mean that the two side gears 13 may be connected to the power split 10. In one or some embodiments, the two side gears 13 are arranged or positioned opposite each other.

As shown in particular in FIG. 2, a particular drive of the side gears 13 may be arranged or positioned on the continuous output shaft 11 or the first or second output shafts 11, 11*a* of the power split 10. A drive power provided to the two side gears 13 using the power split 10 may be converted by means of the two side gears 13; however, the drive power may also be transmitted without conversion.

In one or some embodiments, the two side gears 13 are formed as a traction gear, such as a V-belt gear, which may be considered advantageous with respect to the design of the gear assembly 12. However, the two side gears 13 may also be designed as another traction gear, for example as a chain gear, a bevel gear stage, a crown gear or a multi-stage spur gear. The use of a traction gear as a side gear 13 may make it particularly easy to bridge a spatial distance between the power split 10 and the ram 7.

In one or some embodiments, downstream from the two side gears 13, there is at least one reduction gear 14*a*, 14*b*, (alternatively termed transmission gears) which may be configured to convert the drive output provided using the particular side gear 13 into drive output required for the operation of the ram 7. The reduction gear 14*a*, 14*b* downstream from the particular side gear 13 may be connected (e.g., is configured to be connected) or is connected on the output side to a crankshaft 15 on which the ram 7 is mounted.

In one or some embodiments, at least one flywheel 16 is connected between the at least one reduction gear 14*a*, 14*b* and the particular side gear 13. In one or some embodiments, at least one shiftable clutch device 17 may in turn be connected between the at least one flywheel 16 and the at least one reduction gear 14*a*, 14*b*. In one or some embodiments, the at least one shiftable clutch device 17 is arranged or positioned directly between the at least one flywheel 16 and a gear input of the at least one reduction gear 14*a*, 14*b*.

The actuation of the at least two shiftable clutch devices 17 may be automatically controlled using a control device 19 assigned to the gear assembly 12. In one or some embodiments, the control device 19 may comprise computing functionality (e.g., to perform one, some, or all operations, such as automatic operations, described herein). For example, FIG. 2 illustrates control device 19 as including at least one processor 39 and at least one memory 40. In one or some embodiments, the processor 39 may comprise a microprocessor, controller, PLA, or the like. Similarly, the memory 40 may comprise any type of storage device (e.g., any type of memory). Though the processor 39 and the memory 40 are depicted as separate elements, they may be part of a single machine, which includes a microprocessor (or other type of controller) and a memory. Alternatively, the processor 39 may rely on the memory 40 for all of its memory needs.

The processor 39 and the memory 40 are merely one example of a computational configuration. Other types of computational configurations are contemplated. For example, all or parts of the implementations may be circuitry that includes a type of controller, including an instruction processor, such as a Central Processing Unit (CPU), micro-controller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The control device 19 may be assigned to the square baler 1 itself or to the agricultural machine. In particular, the control device 19 may automatically control the actuation of the at least two shiftable clutch devices 17 in such a way that, when the square baler 1 is started up, the two shiftable clutch devices 17 are in an open state. In one or some embodiments, an open state of the shiftable clutch devices 17 may be a state in which the particular flywheel 16 is decoupled from the reduction gear 14*a*, 14*b* downstream thereof, and therefore no drive output may be transmitted from the at least one flywheel 16 or the component bearing the at least one flywheel 16, such as the at least one side gear 13, to the gear input 18 of the particular reduction gear 14a, 14b. In this switched state of the at least two shiftable clutch devices 17, the at least two flywheels 16 may be accelerated from standstill using the drive power provided by the two side gears 13. As soon as the flywheels 16 have reached their nominal speed or a speed which is below the nominal speed, such as a speed which is up to 70% below the nominal speed (e.g., the value 70% below the nominal speed is included in this range), the control device 19 (which may monitor the speed of the flywheels 16) may controls the actuation of the shiftable clutch devices 17 in such a way that the shiftable clutch devices 17 are transferred to an engaged state (e.g., responsive to the control device 19 determining that the speed of the flywheels 16 has reached at least 70% below the nominal speed, the control device 19 may automatically transmit a command to the shiftable clutch devices 17 in order to control the shiftable clutch devices into the engaged state). In one or some embodiments, an engaged state is a state in which the particular flywheel 16 is coupled to the reduction gear 14a, 14b downstream thereof, and therefore a drive power may be transmitted from the flywheel 16 or the component carrying the flywheel 16, such as the particular side gear 13, to the gear input 18 of the at least one reduction gear 14a, 14b.

According to one embodiment of the gear assembly 12, the at least one shiftable clutch device 17 is designed as a hydraulically actuatable or shiftable clutch device 17, such as a hydraulically actuatable or shiftable multi-plate clutch. In this context, it is contemplated that the control device 19 automatically generates switching signals or control signals (e.g., an example of a type of command) for the components of a hydraulic circuit connected to the at least one hydraulically actuatable or shiftable clutch device 17, for example a hydraulic pump, a shift valve, etc., so that a volume flow for actuating the hydraulically actuatable or shiftable clutch devices 17 is automatically variably adjustable using the control signals to the components.

Alternatively, or in addition, it is also contemplated that the at least two shiftable clutch devices 17 may also be actuated manually by an operator, for example by pressing a foot pedal in a passenger compartment of the agricultural machine.

According to one embodiment of the gear assembly 12, the at least one flywheel 16 may be designed as a component of an output drive 20 of the associated side gear 13. According to one embodiment, the at least one flywheel 16 may be formed integrally with the output drive 20 of the associated side gear 13, so that the output drive 20 and the flywheel 16 form a coherent component. Alternatively, the at least one flywheel 16 may be connected in a force fit, form fit and/or material bond to the output drive 20 of the associated side gear 13, downstream from which the at least one flywheel 16 is arranged or positioned.

In one or some embodiments, the gear assembly 12 may further comprise a power split 32 associated with the at least one reduction gear 14a, 14b. The power split 32 may comprise a multi-stage spur gear. This may make it possible to drive further working units, such as the feed rake 6 and/or the knotter 8, in parallel with the ram 7. If the at least one reduction gear 14a, 14b is designed as a two-stage planetary gear, the power split 32, such as a gear of the power split 32 designed as a spur gear, may be operatively connected to a first web 24 of a first gear stage of the reduction gear 14a.

In one or some embodiments, the drivetrain 3 of the square baler 1 may further be submitted or used, starting from the power split 10 or the output shaft 11, 11a of the power split 10, to drive at least one further working unit, for example a pickup device 4 and/or a cutting rotor 5. For this purpose, at least one further side gear 33 or at least one angular gear may be connected downstream from the power split 10 or the output shaft 11, 11a of the power split 10 and transmit the drive output directly or indirectly, for example via one or more gears, to the further working units, such as pickup device 4 or rotor 5 of the square baler 1.

The illustration in FIG. 3 shows a schematic and exemplary partial sectional view of an embodiment of the gear assembly 12 according to one aspect of the invention. As may be seen from the illustrations in FIGS. 2 and 3, the two reduction gears 14a, 14b may be designed as multi-stage reduction gears 14a, 14b. The two reduction gears 14a, 14b may be arranged or positioned as mirror images in relation to the crankshaft 15.

According to the embodiment illustrated in FIG. 3, the two reduction gears 14 are formed as a planetary gear. Both reduction gears 14a, 14b have the same gear structure.

In one or some embodiments, the reduction gears 14a, 14b are designed as two-stage planetary gears, each of which may be connected or are connected on the input side using the at least one shiftable clutch device 17 to the at least one flywheel 16 or the output drive 20 of the particular side gear 13 comprising the at least one flywheel 16 in such a way that a drive power may be or is supplied to the reduction gears 14a, 14b. On the output side, the reduction gears 14a, 14b, which may be arranged or positioned opposite one another, may be connected or are connected to the crankshaft 15. The gear input of the reduction gears 14a, 14b may comprise a first gear shaft 21 to which a first sun gear 22 is attached. In one or some embodiments, the first sun gear 22 meshes with a plurality of first planetary gears 23, such as four first planetary gears 23, which may be jointly rotatably mounted on a first web 24. The first planetary gears 23 in turn may mesh with a first ring gear 25, which may be rigidly connected to a gear housing 26 that in turn may be connected to the chassis 2 of the square baler 1 or to another component of the square baler 1 so that, during operation of the square baler, the gear housing 26 moves only together with the square baler 1, but not relative to the square baler 1.

In the engaged state of the shiftable clutch device 17 of the particular reduction gear 14a, 14b, the drive power may be supplied to the first sun gear 22 via the first gear shaft 21 (alternatively termed transmission shaft) and may be transmitted to the first planetary gears 23 which run off the first ring gear 25 and transmit a rotary motion to the first web 24. The output therefore may take place in the first gear stage of the reduction gear 14a, 14b, which may be designed as a two-stage planetary gear, via the first web 24. The first web 24 of the first gear stage may be connected to a second gear shaft 27 in such a way that the drive power is transmitted from the first web 24 to the second gear shaft 27 when the shiftable clutch device 17 is in an engaged state. A second sun gear 28 may be mounted on the second gear shaft 27.

In one or some embodiments, the second sun gear 28 meshes with a plurality of second planetary gears 29, such as four second planetary gears 29, which may be jointly rotatably mounted on a second web 30. The second planetary gears 29 may, in turn, mesh with a second ring gear 31, which may be rigidly connected to the gear housing 26. Accordingly, when the shiftable clutch device 17 is in the engaged state, the drive power is supplied, starting from the first gear stage, to the second sun gear 28 via the second gear shaft 27 and is transmitted to the second planetary gears 29 which may run off the second ring gear 31 and transmit a rotary motion to the second web 30. The output therefore may take place in the second gear stage of the particular reduction gear 14a, 14b, via the second web 30, which may be connected or is connected to the crankshaft 15, and therefore when the associated shiftable clutch device 17 is in the engaged state, transmits the drive power to the crankshaft 15 and the ram 7 mounted thereon.

In one or some embodiments, at least one of the reduction gears 14a, 14b of the gear assembly 12 comprises a shiftable overload clutch 34 which is designed to brake the reduction gears 14a, 14b downstream from the flywheels 16 to a standstill when a mechanical overload occurs. In the embodiment of the gear assembly 12 shown in FIG. 3, only the reduction gear 14a has a shiftable overload clutch 34. In one or some embodiments, both reduction gears 14a, 14b may each have a shiftable overload clutch 34. The at least one shiftable overload clutch 34 is controlled by the control device 19.

Figure 4:
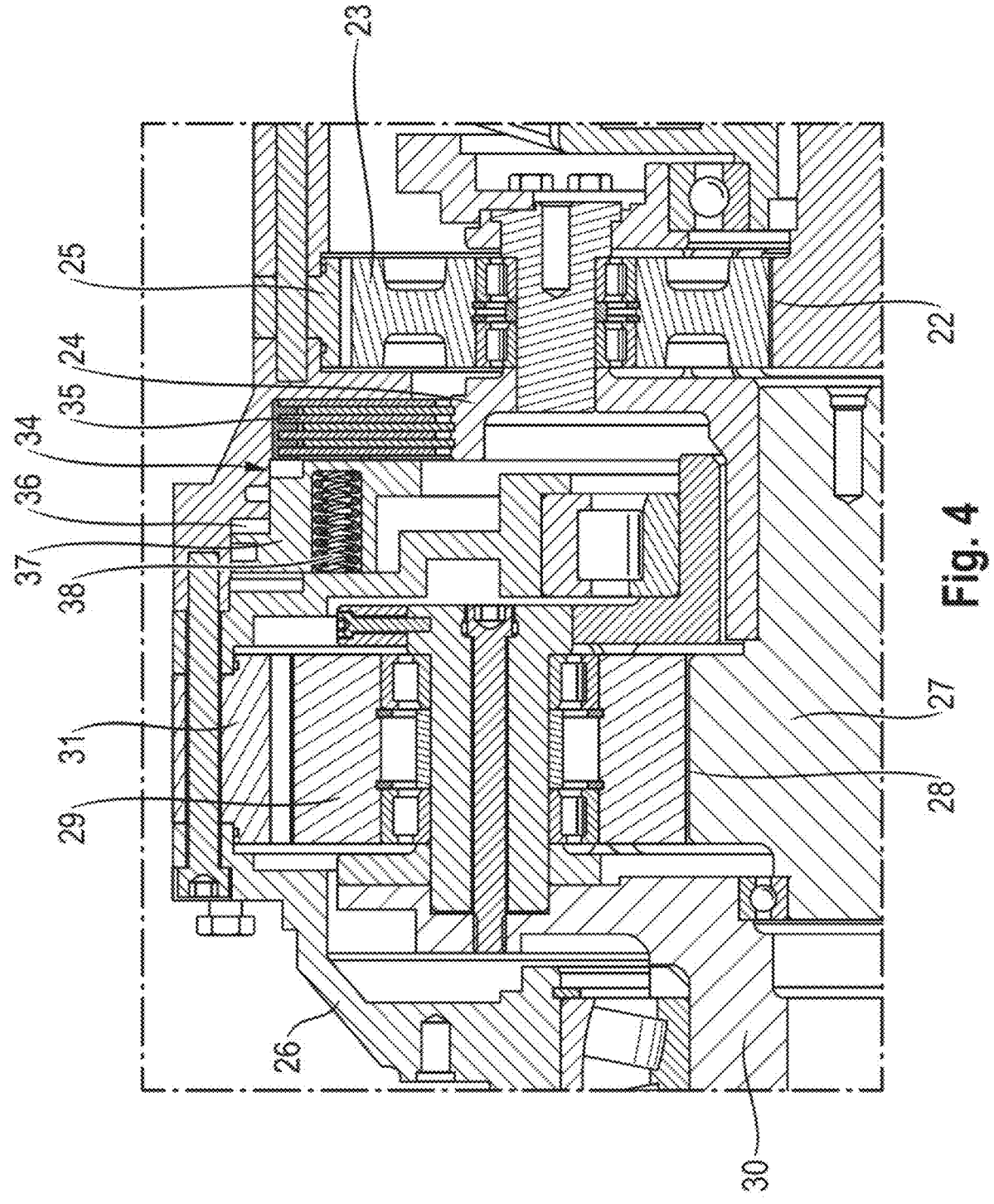
FIG. 4 illustrates a detailed view of one of the reduction gears according to FIG. 3.

FIG. 4 shows a detailed view of the reduction gear 14a according to FIG. 3. The reduction gear 14a according to the illustrated embodiment comprises the at least one shiftable overload clutch 34 of the gear assembly 12 integrated in the reduction gear 14a, which serves to brake the reduction gears 14a, 14b when a mechanical overload occurs.

In one or some embodiments, the at least one shiftable overload clutch 34 is designed as a hydraulically actuatable clutch device, such as a hydraulically-actuatable multi-plate clutch. In one or some embodiments, the at least one shiftable overload clutch 34 comprises a disk pack 35 which is arranged or positioned coaxially to the first web 24 of the first gear stage on the latter. Furthermore, the at least one shiftable overload clutch 34 may comprise a pressure chamber 36 to which hydraulic pressure may be applied, and an axially displaceable piston 37 in which at least one spring element 38 is arranged or positioned. By applying pressure to the pressure chamber 36, the piston 37 may be held against the spring force of the at least one spring element 38 in a position axially spaced from the disk pack 35. In this disengaged shift position of the overload clutch 34, the drive power may thus be supplied to the second gear shaft 27 of the reduction gear 14a in the engaged state of the shiftable clutch device 17, starting from the first gear stage.

In one or some embodiments, to detect a mechanical overload, sensors for detecting a mechanical overload may be assigned to or positioned in or on the gear assembly 12 and/or the working units, such as rotor 5, feed rake 6, ram 7, knotter 8. The sensors may transmit signals (e.g., indicative of sensor data) to the control device 19 for automatic evaluation. The control device 19 is configured to automatically detect the occurrence of a mechanical overload on the basis of the evaluation of the signals provided by the sensors in order to correspondingly actuate the at least one overload clutch 34 and/or the shiftable clutch devices 17. For example, the control device 19 may be configured to automatically compare the sensor data with predetermined value(s) in order to automatically detect the occurrence of a mechanical overload.

Responsive to the control device 19 automatically detecting the mechanical overload, the control device 19 may automatically depressurize the pressure chamber 36 by actuating a valve block so that the at least one spring element 38 presses the piston 37 against the disk pack 35, whereby the braking process is initiated and executed. For example, the control device 19, responsive to automatically detecting the mechanical overload, may automatically send a command to the valve block to depressurize the pressure chamber 36. Responsive thereto, the drive power may be transferred from the first web 24 to the gear housing 26 by the frictional connection between the piston 37 and the disk pack 35. In order to prevent drive power from being transmitted from the flywheels 16 to the reduction gears 14a, 14b during the braking process, the control device 19 is configured to automatically actuate the shiftable clutch devices 17 simultaneously with that of the overload clutch 34 in order to transfer the shiftable clutch devices 17 from their engaged shift position to their disengaged shift position (e.g., the control device 19 is automatically configured to simultaneously transmit commands to the shiftable clutch devices 17 and the overload clutch 34 for simultaneous actuation).

In one or some embodiments, it is also contemplated to brace the shiftable clutch device 17 and the associated overload clutch 34 against each other so that the remaining drive energy may be decelerated via the stationary ram 7.

Furthermore, the control device 19 may be configured to automatically actuate the interposed shiftable clutch devices 17 after detection of the standstill of the reduction gears 14a, 14b (e.g., responsive to the control device 19 automatically detecting, via sensed data, the standstill of the reduction gears 14a, 14b) in order to transfer the reduction gears 14a, 14b from the disengaged shift position to their engaged shift position by progressive closure. This may also serve to brake the flywheels 16, which may continue to rotate due to their mass inertia even if the drivetrain 3 of the driven machine is interrupted, for safety reasons.

As already explained above, both reduction gears 14a, 14b may each be designed with an overload clutch 34.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

| List of Reference Numbers | |
| --- | --- |
| 1 | Square baler |
| 2 | Chassis |
| 3 | Drivetrain |
| 4 | Pickup device |
| 5 | Cutting rotor |
| 6 | Feed rake |
| 7 | Ram |
| 8 | Knotter |
| 9 | Drive shaft |
| 10 | Power split |
| 10a | Bevel gear |
| 10b | Bevel gear |
| 11 | Output shaft |
| 11a | Output shaft |
| 11b | Output shaft |
| 12 | Gear assembly |
| 13 | Side gear |
| 14a | Reduction gear |
| 14b | Reduction gear |
| 15 | Crankshaft |
| 16 | Flywheel |
| 17 | Shiftable clutch device |
| 18 | Gear input |
| 19 | Control device |
| 20 | Output drive |
| 21 | First gear shaft |

-continued

| List of Reference Numbers | |
| --- | --- |
| 22 | First sun gear |
| 23 | First planetary gear |
| 24 | First web |
| 25 | First ring gear |
| 26 | Gear housing |
| 27 | Second gear shaft |
| 28 | Second sun gear |
| 29 | Second planetary gear |
| 30 | Second web |
| 31 | Second ring gear |
| 32 | Power split |
| 33 | Side gear |
| 34 | Overload clutch |
| 35 | Disk pack |
| 36 | Pressure chamber |
| 37 | Piston |
| 38 | Spring element |
| 39 | Processor |
| 40 | Memory |

The invention claimed is:

1. A gear assembly for a square baling press configured to drive a ram positioned movably between end positions in a pressing channel of the square baling press and at least one additional working unit of the square baling press, the gear assembly comprising:

two side gears;

at least one reduction gear that is downstream from at least one of the two side gears and that is configured to connect on an output side to a crankshaft on which the ram is mounted;

at least one flywheel positioned between the at least one of the two side gears and the at least one reduction gear downstream thereof; and at least one shiftable clutch device positioned between the at least one flywheel and the at least one reduction gear connected downstream thereof;

wherein the at least one of the reduction gear comprises at least one shiftable overload clutch configured to brake the at least one reduction gear downstream from the at least one flywheel to a standstill responsive to a mechanical overload; and wherein the at least one shiftable clutch device is configured to be in a disengaged shift position during braking.

2. The gear assembly of claim 1, wherein the at least one reduction gear comprises a first reduction gear and a second reduction gear; and wherein one or both of the first reduction gear and the second reduction gear comprise the at least one shiftable overload clutch.

3. The gear assembly of claim 1, further comprising a control device configured to:

automatically detect the mechanical overload; and responsive to automatically detecting the mechanical overload, automatically control the at least one shiftable clutch device to be in the disengaged shift position.

4. The gear assembly of claim 3, wherein the control device is further configured to actuate the at least one shiftable clutch device responsive to detecting a standstill of the at least one reduction gear in order to transfer the at least one shiftable clutch device from the disengaged shift position to an engaged shift position by progressive closure.

5. The gear assembly of claim 3, wherein the control device further configured to:

responsive to automatically detecting the mechanical overload, automatically actuate the at least one shiftable overload clutch to brake the at least one reduction gear downstream from the at least one flywheel.

6. The gear assembly of claim 5, wherein the control device, responsive to automatically detecting the mechanical overload, is configured to simultaneously: (i) automatically actuate the at least one shiftable overload clutch to brake the at least one reduction gear; and (ii) automatically control the at least one shiftable clutch device to be in the disengaged shift position.

7. The gear assembly of claim 5, wherein the control device, responsive to automatically detecting the mechanical overload, is configured to control the at least one shiftable overload clutch and the at least one shiftable clutch device so that the at least one shiftable overload clutch brakes the at least one reduction gear and the at least one shiftable clutch device is in the disengaged shift position at least partly simultaneously.

8. The gear assembly of claim 1, wherein the at least one shiftable clutch device is positioned directly between the at least one flywheel and a gear input of the at least one reduction gear downstream from the at least one flywheel.

9. The gear assembly of claim 1, wherein the at least one shiftable clutch device comprises a hydraulically-actuated clutch device.

10. The gear assembly of claim 1, further comprising pin-shaped shear elements configured to detect the mechanical overload.

11. The gear assembly of claim 1, wherein the at least one shiftable overload clutch comprises a hydraulically-actuatable clutch device;

wherein the at least one shiftable overload clutch comprises a disk pack and a piston configured to be subjected to hydraulic pressure and in which at least one spring element is arranged;

wherein the piston is configured to be held in a position spaced apart from the disk pack by the hydraulic pressure counter to spring force of the at least one spring element; and wherein the at least one shiftable overload clutch is configured to be depressurized responsive to detecting the mechanical overload.

12. The gear assembly of claim 1, wherein the at least one flywheel comprises at least two flywheels;

wherein the at least two flywheels are positioned one behind the other on an output drive of the at least one of the two side gears;

wherein another clutch device is positioned between the at least two flywheels.

13. The gear assembly of claim 1, wherein the at least one reduction gear is designed as planetary gears or as multi-stage spur gears.

14. The gear assembly of claim 1, wherein the at least one reduction gear comprises at least two reduction gears; and wherein the least two reduction gears are each designed with a respective shiftable overload clutch.

15. A gear assembly for a square baling press configured to drive a ram positioned movably between end positions in a pressing channel of the square baling press and at least one additional working unit of the square baling press, the gear assembly comprising:

two side gears;

at least one reduction gear that is downstream from at least one of the two side gears and that is configured to connect on an output side to a crankshaft on which the ram is mounted;

at least one flywheel positioned between the at least one of the two side gears and the at least one reduction gear downstream thereof, wherein the at least one of the reduction gear comprises at least one shiftable overload clutch configured to brake the at least one reduction gear downstream from the at least one flywheel to a standstill responsive to a mechanical overload; and a control device configured to:

automatically detect the mechanical overload; and responsive to automatically detecting the mechanical overload, actuate the at least one shiftable overload clutch to brake the at least one reduction gear downstream from the at least one flywheel.

16. The gear assembly of claim 15, further comprising one or more sensors assigned to one or both of the gear assembly or to the at least one additional working unit and configured to generate sensor data; and wherein the control device is further configured to receive the sensor data and to automatically detect the mechanical overload based on automatic analysis of the sensor data.

17. A square baler comprising:

a drivetrain comprising a gear assembly and configured to drive one or more working units of the square baler, and to drive a ram positioned movably between end positions in a pressing channel of the square baler;

wherein the gear assembly comprises:

two side gears;

at least one reduction gear that is downstream from at least one of the two side gears and that is configured to connect on an output side to a crankshaft on which the ram is mounted;

at least one flywheel positioned between the at least one of the two side gears and the at least one reduction gear downstream thereof; and at least one shiftable clutch device positioned between the at least one flywheel and the at least one reduction gear connected downstream thereof;

wherein the at least one of the reduction gear comprises at least one shiftable overload clutch configured to brake the at least one reduction gear downstream from the at least one flywheel to a standstill responsive to a mechanical overload; and wherein the at least one shiftable clutch device is configured to be in a disengaged shift position during braking.

18. The square baler of claim 17, wherein the at least one reduction gear comprises a first reduction gear and a second reduction gear; and wherein one or both of the first reduction gear and the second reduction gear comprise the at least one shiftable overload clutch.

* * * * *